United States Patent [19]

Greene, Jr.

[11] 3,849,763

[45] Nov. 19, 1974

[54] CHANNEL DELAY CHECKBACK APPARATUS

[75] Inventor: James E. Greene, Jr., Convent Station, N.J.

[73] Assignee: Westinghouse Electric Corporation, Pittsburgh, Pa.

[22] Filed: Aug. 29, 1973

[21] Appl. No.: 392,691

[52] U.S. Cl. ........ 340/147 R, 340/310, 340/147 LP

[51] Int. Cl. ........................................... H04q 1/20

[58] Field of Search.... 340/147 R, 310, 170, 147 C, 340/147 LP; 317/27

[56] References Cited

UNITED STATES PATENTS 3,798,598 3/1974 Tambert......................... 340/147 R

*Primary Examiner*—Harold I. Pitts

*Attorney, Agent, or Firm*—J. L. Stoughton

[57] ABSTRACT

A phase comparison unblocking relaying network. Included are means for checking the operability of channel delay of the communication and/or channel which carries the phase comparing information between the local and remote relaying stations.

21 Claims, 3 Drawing Figures

CHANNEL DELAY CHECKBACK APPARATUS

CROSS REFERENCE TO RELATED APPLICATIONS

This invention relates to channel time checking means and is shown as embodied in the phase comparing relay network shown and described in a copending U.S. Pat. application Ser. No. 295,031, filed Oct. 4, 1972 in the name of William Strickland and Walter L. Hinman Jr. and assigned to the same assignee as is this application.

BRIEF SUMMARY OF THE INVENTION

This invention relates to a channel time checking means, whereby the operation of the channel may be quickly and conveniently checked manually or automatically without interfering with the functioning of the network with which it may be associated.

DETAILED DESCRIPTION

Figure 1:
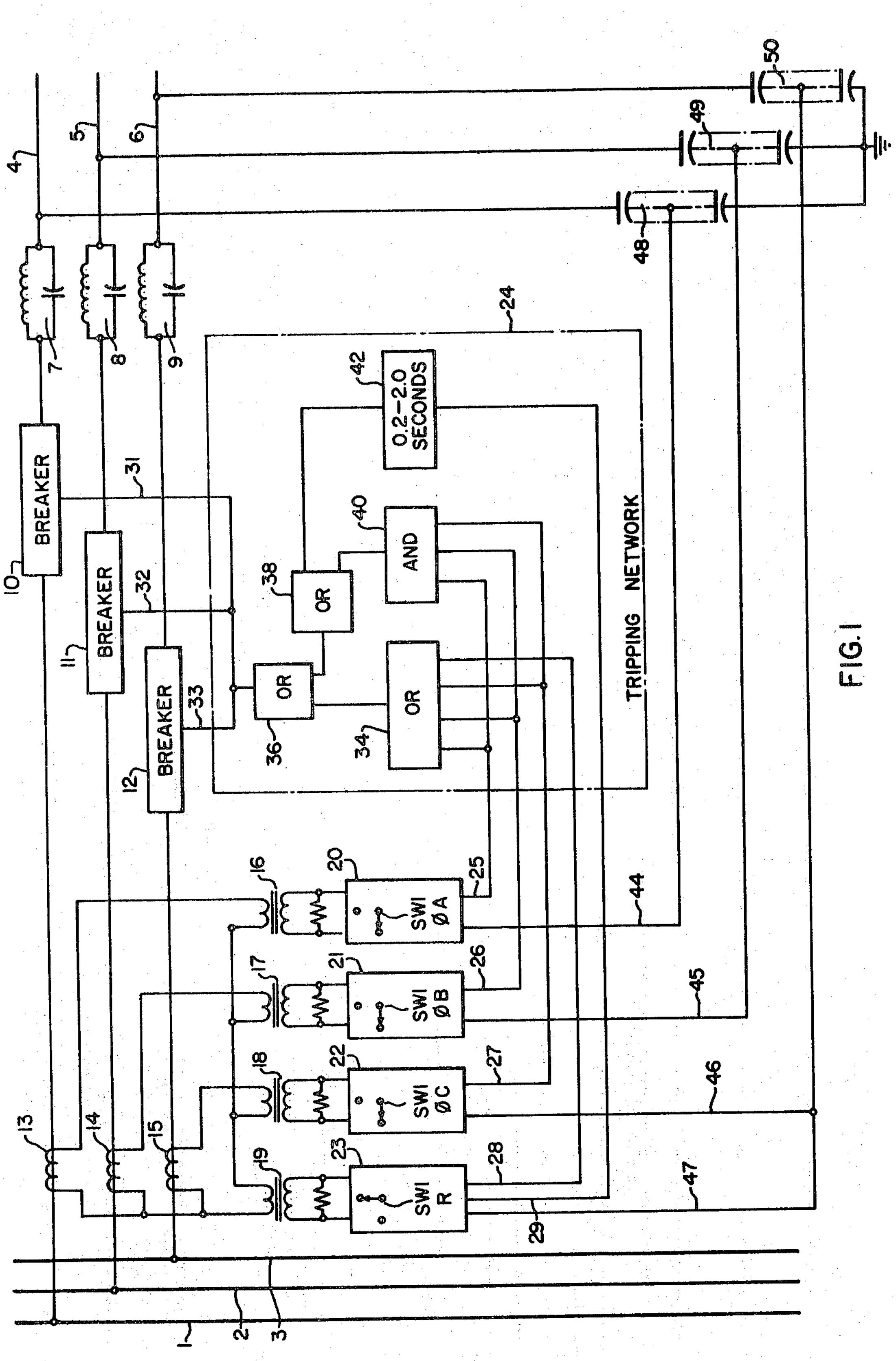
FIG. 1 is a schematic drawing of a phase comparison unblocking relaying apparatus associated with a three-phase power transmission line embodying the invention.
Figure 2:
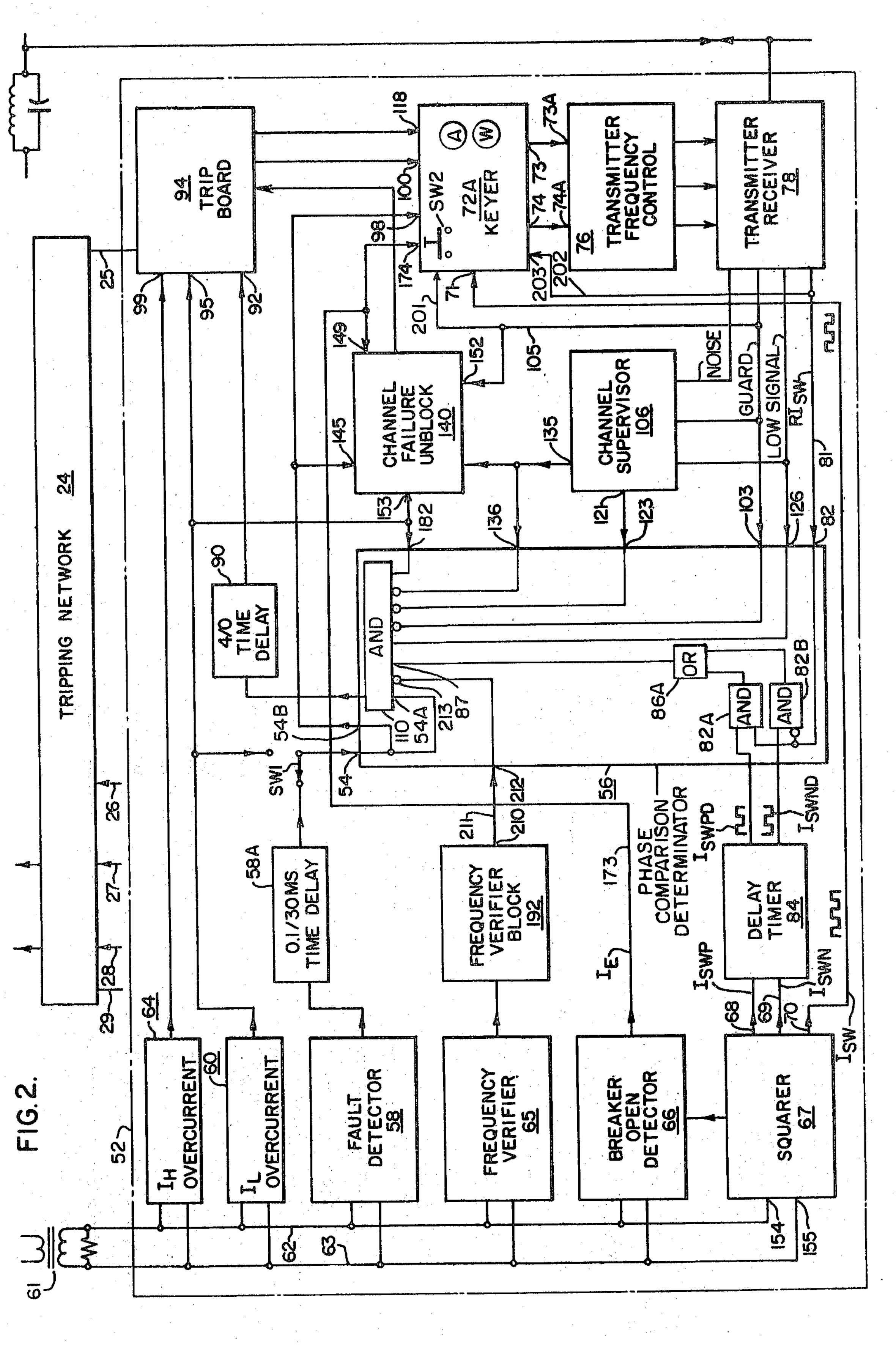
FIG. 2 is a more detailed schematic drawing showing of the relaying apparatus which is associated with each of the three-phase conductors.

FIGS. 1 and 2 are substantially identical to FIGS. 1 and 2 of the said copending application and the reference characters used herein are the same as those used in the said copending application. In view of the more complete showing and description of the phase comparison relaying apparatus in the said copending application only a brief description of the operation thereof will be set forth herein. With the exception of the details shown as being included in the keyer network 72A the detailed circuitry appearing in the illustrated blocks is substantially as shown in detail in said copending application.

FIG. 1 illustrates the relaying apparatus associated with one of the terminals of the three-phase power transmission line being protected and which for convenience will be referred to as the local terminal; it being understood that a similar apparatus is associated with the other or remote terminal of the line being protected. The reference characters 1, 2 and 3 indicate respectively the three-phase buses at the local station which are supplied with power from one or more suitable sources (not illustrated) and which are respectively connected to the transmission line phase conductors 4, 5 and 6 through low-pass filters 7, 8 and 9 and breakers 10, 11 and 12 respectively to the buses 1. 2 and 3. The current flow between the buses 1, 2 and 3 and the phase conductors 4, 5 and 6 is monitored by the current transformers 13, 14 and 15 which are connected to energize isolating transformers 16, 17, 18 and 19 connected in a suitable array such that the transformers 16, 17 and 18 respectively monitor the current flow through the buses 4, 5 and 6 and the transformer 19 is energized with a residual quantity which represents the ground current. The phase current responsive relaying networks 20, 21 and 22 and a residual or ground network 23 are energized from the output of the transformers 16, 17, 18 and 19 respectively. Resistors are connected across the secondary windings of the transformer 16, 17, 18 and 19 so that the quantities supplied to the networks 20, 21, 22 and 23 are voltage quantities, the magnitude of which is determined by the magnitude of the current supplied to the transformer 16, 17, 18 and 19. The networks 20, 21, 22 and 23 are provided with output conductors 25, 26, 27 and 28 which when a fault occurs supply output quantities to the tripping network 24.

The tripping network 24, comprises an OR network 34 to which each of the output conductors 25, 26 and 27 are connected. The output of the OR network 34 is connected to a first input terminal of an OR network 36. Therefore whenever any one or more of the conductors 25, 26 and 27 are energized with a logical 1 signal, the OR network 36 will be provided with a tripping signal which, since its output is connected by means of conductors 31, 32 and 33 to the breakers 10, 11 and 12, will trip the breakers. The output conductors 25, 26 and 27 are also connected to the three input terminals of an AND network 40; the output terminal of which is connected to one input terminal of an OR network 38. The output of this OR network 38 is connected to a second input of the OR network 36 to permit the tripping of the breakers 10, 11 and 12 in response to a logical 1 output signal from the AND network 40. The ground or residual current network 23 is provided with a second output conductor 29 which is connected through a timer 42 to a second input terminal of the OR network 38. The conductor 29 is provided with a logical 1 output signal whenever the magnitude of the ground current is above a predetermined minimum irrespective of its relationship to the ground or residual current at the remote end of the protected line section.

FIG. 2 shows in a greater detail a network 52 which may be used for any of the networks 20–23. The isolating transformer 61 (which corresponds to any one of the transformers 16–19) has a loading resistor connected across its secondary winding so that the buses 62 and 63 will be energized with a voltage quantity which is proportional to the current flow through the primary of the winding 61. During normal operation with no-fault current flowing through the transformer 61 the fault detector 58 energized thereby will have a logical 0 output and the time delay 58A will also have a logical 0 output.

When the switch SW1 is in the position illustrated in FIG. 2, the network 52 is conditioned for use as a phase conductor phase-fault determining network. When the switch SW1 is in its other position, the network is conditioned for use as a ground or residual current fault determining network. The logical 0 output of the time delay 58A is supplied to one input terminal 54A of an AND network 110 and also to the output terminal 54B which is connected to the input terminal 98 of the keyer 72A and to the input terminal 145 of the channel failure unblock network 140.

A frequency verifier 65 is energized from the buses 62 and 63 and its output is connected to a frequency verifier block 192. The output terminal 210 of the block 192 is connected by the conductor 211 to the input terminal 212 of the phase determinator 56 and therefrom to the NOT input terminal 213 of the AND network 110. Normally the frequency verifier block 192 will supply a logical zero signal.

A breaker open detector 66 is energized from the buses 62 and 63 and with the corresponding one of breakers 10, 11 or 12 closed, will supply a logical 1 out-out signal through the bus 173 to the input terminals 149 and 174 of the channel failure unblock 140 and the keyer 72A respectively. This logical 1 signal permits the networks to which they are applied to operate normally. If for some reason or other the associated breaker has been opened a logical 0 signal will be supplied to the conductor 173 which will enable the keyer 72A to terminate any further transmission of the guard signal to the remote station and to transmit continuously a trip-signal.

An $I_L$ overcurrent netowrk 60 is energized from the buses 62 and 63 so that the current flow through the corresponding phase conductor is above the charging current value of this conductor a logical 1 output signal will be supplied by the $I_L$ overcurrent network 60 to the input terminal 95 of the trip board 24, to the terminal 153 of the channel failure unblock 140 and terminal and 182 of the phase comparison determinator 56. In the absence of the logical 1 output signal from the network 60, the associated one of the breakers 10, 11 and 12 cannot be tripped by its associated one of the networks 20, 21 and 22.

Since no residual or ground current should flow unless there is a ground fault the $I_L$ overcurrent network 60 is connected by the switch SW1 to the input terminal 54 and is in effect utilized as the ground fault detector. In the event of an extremely high fault current, it is desirable to trip the associated breaker as rapidly as possible and for that purpose an $I_H$ overcurrent network 64 energized from the buses 62 and 63 is provided. Whenever the phase conductor current is below a predetermined maximum value the overcurrent network 64 supplies a logical 0 signal to the input terminal 99 of the trip board without effect. However, should the fault current exceed this predetermined maximum value, a logical 1 signal will be applied to the conductor 99 which results in an immediate logical 1 output signal to the tripping network 24 so that the tripping network 24 will immediately trip the breakers 10, 11 and 12.

A squarer network 67 has its input terminals 154 and 155 energized from the buses 62 and 63 and normally provides 0 a pulsating output signal at its output conductors 68, 69 and 70. The pulsations $I_{SWP}$ on the output conductor 68 represent the length of the positive half cycles of the voltage signal on the conductors 62 and 63 and are in predetermined phase relation therewith. Similarly the pulsating signal $I_{SWN}$ on the output conductor 69 represents the negative half cycles of the input wave to the squarer 67. The output conductor 70 is supplied with a signal $I_{SW}$ substantially the same as that supplied to the output conductor 69. This conductor 70 is connected to the input terminal 71 of the keyer 72A and through circuitry to the described hereafter which will, in the event of a fault, cause the transmitter frequency control 76 to actuate the transmitter receiver 78 so that it will operate to terminate the transmission of the guard signal and to transmit an output signal to provide trip + and trip − signals over the one of the conductors 44, 45, 46 and 47 with which such transmitter is associated whereby the phase of the current at one station is supplied over the connecting channel (in this case by means of power line carrier frequency) to the corresponding apparatus at the other station of the protected line section. The receiver of the transmitter receiver at the remote station is responsive to the signal transmitted by the transmitter portion of transmitter receiver 78 at the local end and similarly the receiver of the transmitter receiver at the local end responds to the signal supplied by the transmitter receiver at the remote end.

The transmitter receiver 78 is provided with an output conductor 81 which is connected to the input terminal 82 of the phase comparison determinator and therethrough to the non-inverted and inverted NOT terminals of the AND networks 82A and 82B respectively and supplies the sssignal $RI_{SW}$. The $I_{SWP}$ and $I_{SWN}$ signals are supplied to the delay timer 84 which delays them by substantially the time delay afforded by the communication channel between the local and remote line terminals so that the output quantities $I_{SWPD}$ and $I_{SWND}$ which are applied to the input terminals 85 and 86 of the phase comparison determinator 56 for energization of the second non-inverted input terminals of the AND networks 82A and 82B in proper phase relationship with respect to the signal $RI_{SW}$ supplied by the transmitter receiver 78. If the fault is internal in the protected line, the logical 1 portion of the signal $RI_{SW}$ and $I_{SWPD}$ will be substantially in phase and an output signal will be supplied from the AND network 82A to one input of the OR network 86A. During the period that the quantity $RI_{SW}$ has a logical 0, it will be substantially in phase with the logical 1 output from the quantity $I_{SWND}$ and the AND network 82B will apply a logical 1 output quantity to the OR network 86A. When a logical 1 input quantity is supplied to one or both of its input terminals, the OR network 86A supplies a logical 1 signal to the input terminal 87 of the AND network 110. With a normally operating network 52, the input terminals 182 and 126 will be provided with logical 1 quantities and the input terminals 136, 123 and 103 will be supplied with logical 0 signal so that when logical 1 signals are supplied to the input terminals 54A and 87 and the AND network 110 will supply a logical 1 output quantity or signal to the time relay delay 90. If this quantity is existent for a 4 millisecond time interval (indicative of fault current flowing into the line section from both ends at the same time or flowing outwardly of the line section at the same time) a logical 1 signal will be supplied to the input terminal 92 of the trip board 94. This results in a logical 1 signal on the conductor 25 and the tripping of the breakers 10, 11 and 12.

Figure 3:
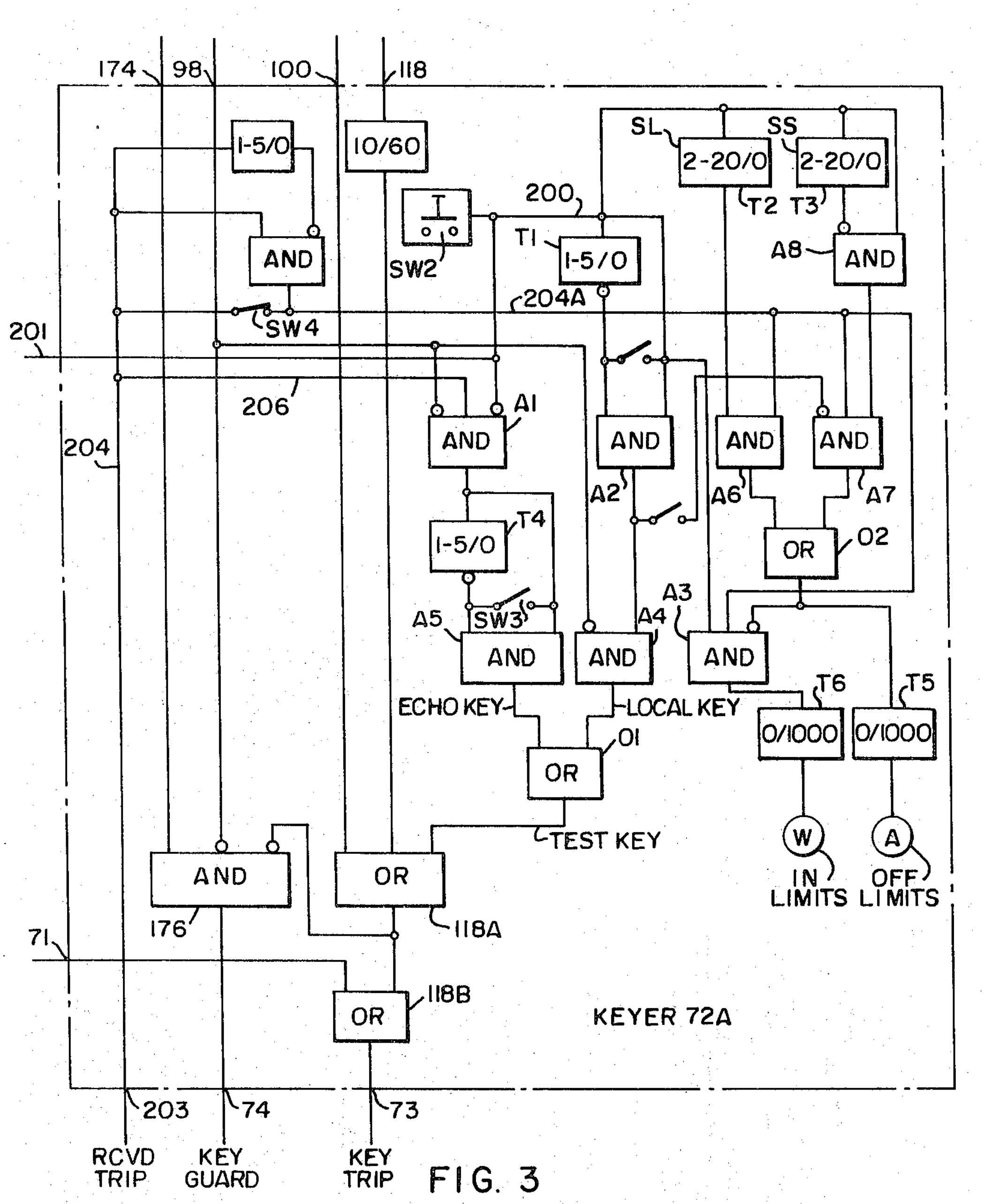
FIG. 3 is a view of the keyer network for controlling the transmitter-receiver and which embodies the apparatus for the channel delay checkback means.

In the operation of phase comparing relating networks it is desirable, from time to time, to check the operation of the communicating channel to insure that it is still operating within the desired operating time limits. Apparatus for this purpose is illustrated as being a part of the keyer 72A and is shown in FIG. 3. Referring first to the normal operation of the keyer 72A, it will be appreciated that its input terminal 174 is normally supplied with a logical 1 signal to place a first supervisory signal on the non-inverted input terminal of the AND network 176. In the absence of a fault, a lobical 0 signal will be applied to the input terminal 98 to provide a second supervisory signal to the first NOT input terminal of the AND network 176. Assuming a logical 0 input signals to each of the input terminals of the OR network 118A a logical 0 signal will be provided to the second NOT input terminal of the AND network 176 so that a logical 1 signal is supplied to the output terminal 74. Under these conditions, the transmitter frequency control 76 will maintain the transmitter portion of the transmitter-receiver 78 in a condition in which it will transmit its guard signal.

In the event of the occurrence of a fault, the input terminal 98 will be energized with a logical 1 signal thereby disabling the AND network 176 and establishing a logical 0 signal at the output terminal 74. The alternating logical 1 and logical 0 signals normally applied to the input terminal 71 by the quantity $I_{SW}$ provides alternating logical 1 and logical 0 signals at the output terminal 73 which with a logical 1 output signal at terminal 74 renders the transmitter frequency control 76 effective to drive the transmitter portion of the transmitter-receiver to terminate the transmission of guard signal and commence the transmission of the trip + and trip − signal to provide the phase related signals to the receiver portion of the transmitter-receiver 78 at the remote end of the protected line. Similarly the recognition of a fault at the remote line terminal will cause its transmitter to terminate its transmission of guard signal and commence the transmission of trip + and trip − signals from the remote end or station to the local end or station to provide the $RI_{SW}$ signal which is indicative of the phase of the current at the remote end. The $RI_{SW}$ signal applied to the AND networks 82A and 82B to permit a logical 1 signal to be supplied to the input terminal 87 of the end network 110 if the phase of the current at the two end portions of the protected line section indicates that the fault is internal and will prevent a logical 1 signal from being applied to the terminal 87 in the event that the phase relationship of the two currents indicates that fault is external to the protected lines section.

In the event of the fault current magnitude above the maximum required to energize the $I_H$ overcurrent network 64, a logical 1 signal will be applied to the input terminal 99. This terminal 99 is connected within the trip board 94 to the conductor 25 and to the conductor which is connected to the terminal 100 of the keyer 72A so that a logical 1 input signal is supplied to the OR network 118A. This OR network 118A will then apply a logical 1 signal to the OR network 118B and a logical 1 signal to disable the AND network 176. Disabling of the AND network 176 places a logical 0 output signal at the terminal 74 and interrupts the transmission of guard signal by the transmitter portion of the transmitter-receiver 78. In this case, however a continuous logical 1 signal will be applied to the OR network 118A and therefrom to the OR network 118B and a continuous logical 1 signal will appear at the output terminal 73. This causes the transmitter portion of the transmitter receiver 78 to send a continuous tripping signal to the other terminal so that one of the AND networks 82A or 82B will be energized to place a tripping logical 1 signal at the input terminal 87 of the AND network 110 of the opposite or remote station to permit tripping of the remote circuit breaker irrespective of the phase relationship of the current at the two ends of the transmittion line.

The keyer 72A also includes a switch SW2 which may be manually actuated as desired or which may be periodically closed in any desired manner as for example by a clock or other means to program the operation for periodic checking of the channel time to determine whether it is within limits. The closure of the switch SW2 causes a logical 1 signal to be applied to the conductor 200 and thereby to a first NOT input terminal of an AND network A1, to the input terminal of a timer T1, to a non-inverted input terminal of a second AND network A2, to the non-inverted input terminal of a third AND network A3 and to the non-inverted terminal of the AND network A8 as well as to the input terminals of a set-long SL input timer T2 and set-short SS input timer T3. Normally in phase comparison relaying, the local receiver is not energized by any transmission of the local transmitter and the connection between the conductor 200 and the NOT input of the AND network A1 may be omitted. This NOT input of the AND network A1 is connected by a conductor 201 and the conductor 105 to the guard output of the transmitter receiver 78. As long as the transmitter receiver 78 is receiving a guard signal it will maintain a logical 1 signal on conductor 201 to provide additional security against keying the transmitter receiver 78 to trip because of noise on the transmitter receiver trip output conductor 202. With this arrangement all of the actuation of the OR network 118A will be under the control of the switch SW2 through the timer T1 and AND network A2 and A4.

The NOT output of the timer T1 is connected to the other non-inverted input of the timer A2. With this arrangement a logical 1 signal will be supplied to the both terminals of the AND network A2 for only a predetermined time interval as determined by the timer T1. When both input terminals of the timer A2 have logical 1 inputs, the output terminal of the AND network A2 will supply a logical 1 signal to the non-inverted input terminal of the AND network A4. In the absence of a fault on the associated phase conductor, a logical 0 input signal will be supplied to the NOT or inverted input terminal of the AND network A4 from the input terminal 98 so that the presence of the logical 1 output signal from the AND network will cause the AND network A4 to supply a logical 1 output signal to one of the input terminals of OR network 01. This causes the OR network 01 to supply a logical 1 signal to the OR network 118A which, as before mentioned, causes the transmitter to send a logical 1 signal for the time interval as determined by the timer T1.

The logical 1 signal is received by the receiver at the other end of the line section which is equipped with a network identical to the keyer 72A whereby the logical 1 input signal is applied over the remote conductor 202 to the remote input terminal 203 of the remote keyer 72A. This energizes a remote conductor 204 with a logical 1 signal which is connected by means of remote conductor 206 to a non-inverted input terminal of the remote AND network A1. It is assumed that the remote switch SW2 is open and the associated phase conductor is not faulted so that a logical 0 signal is being supplied to the inverter input terminal of the remote AND network A1.

The output terminal the remote AND network A1 will provide a logical 1 signal to the input terminal of remote timer T4, assuming switch SW3 is open as illustrated, and will also apply a logical 1 signal to a first non-inverted input terminal of the remote AND network A5. During the timing-out period of the remote timer T4, its NOT output will apply a second logical 1 signal to the second non-inverted input terminal of the remote AND network A5 whereby a logical 1 signal is applied to the remote OR network 01 in the actuation of the transmitter portion of the remote transmitter receiver to condition it to supply a logical 1 signal to the receiver of the local transmitter receiver 78 over the communicating channel. This logical 1 signal causes the receiver at the local station to place a logical 1 signal on on the local conductor 204 and, assuming the switch SW4 closed as illustrated, will provide a logical 1 signal to non-inverted input terminals of the AND networks A3, A6 and A7.

The AND network A8 in cooperation with the timing network T3 provides a logical 1 signal to one of the non-inverted input terminals of the AND network A7 for a first predetermined time interval subsequent to closure of the switch SW2. This interval is known as the "short-set" interval and is set to indicate the predetermined minimum design time interval for the transmission of a signal from the local keyer 72A to the remote relaying station and back to the output of the receiver portion of the local transmitter receiver 78 minus the amount of designed tolerance for the network. The output of the AND network A7 is energized with a logical 1 signal and for least the final part of the short-set interval.

If a logical 1 signal appears on the conductor 204 and 204A concurrently with the logical 1 signal controlled by the "short-set" timer T3, the AND network A7 will supply a logical 1 signal to the OR network 02 and the off-limits timer T5 will substantially instantaneously energize an "off-limits" amber light A. If however, the channel is within minimum operational limits, the logical 1 signal from the AND network A8 will be terminated prior to the appearance of the logical 1 signal on the conductor 204A and the OR network 02 will not be operated by the AND network A7.

The "set-long" timer T2 will not apply a logical 1 signal to the non-inverted input terminal of the AND network A6 to which it is connected until it has timed out. If the channel is within maximum operational time limits, the logical 1 signal applied over the conductor 204A will have terminated and removed the logical 1 signal from the non-inverted input terminal of the AND network A6 and no logical 1 signal will be supplied by the AND network A6 to the OR network 02 and the off-limit timer T5 will not be energized to actuate the off-limit light A. Under this "in-limit" condition, a logical 0 signal from the OR network 02 and a logical 1 signal from the conductor 200 will cause the AND network A4 to energize the "in-limits" timer T6 and actuate the in-limits white lamp W.

The timer T4 at the remote station should limit the interval of the transmission of the signal by the remote transmitter to a time interval that will result in the termination of the logical 1 signal on the local conductor 204A prior to the timing out of the local "set-long" timer T2 when the channel time is within tolerance. For this purpose the remote timer T2 is set for a time interval which is equal to the design time interval required for the keyer to actuate the local transmitter and send a signal to the remote receiver which thereupon actuates the remote transmitter to send a signal back to the local receiver and plus the tolerance time of the channel and minus the setting of the remote timer T4. Should the channel time be too long, the logical 1 signal will remain on the conductor 204A after the timing out of the local "set-long" timer T2 the AND network A6 will supply a logical 1 signal to the OR network 02 which will energize the off-limits timer T5 and the off-limits amber light A.

What is claimed and is desired to be secured by United States Letters Patent is as follows:

1. A channel measuring device comprisng a trnsmitter adapter to be connected to said channel for supplying a first control signal thereto, a receiver adapter to be connected to said channel for receiving a second signal therefrom said receiver providing a third control signal when initially energized by said second signal, first and second timing networks, said first and second timing networks having first and second timing periods, said first and second periods determining respectively the minimum and maximum acceptable time limits of said channel, means for concurrently initiating the timing out of said timing networks and the initiating of the operation of said transmitter to transmit said first signal, a comparing network having a plurality of input circuits and an output circuit, a first and a second of said input circuits being operatively connected to said first and second timing networks respectively for actuation thereby, a third of said input circuits being connected to said receiver for actuation by said third control signal when said receiver is receiving said second control signal, said comparing network being adapted to provide a fourth control signal when said third control signal is supplied to its said third input solely prior to the timing out of said first timing network and subsequent to the timing out of said second timing network.

2. The device of claim 1 in which means is provided to limit the duration of the application of said third control signal to said third input circuit.

3. The device of claim 1 in which said comparing network includes first and second coincidence networks, each said coincidence network having a pair of input terminals and an output terminal, a first of said input terminals of said first coincidence network being operatively connected to said first input circuit, a first of said input terminals of said second coincidence network being operatively connected to said second input circuit, first connecting means operatively connecting a second of said input terminals of said first coincidence network to said third input circuit, second connecting means operatively connecting a second of said input terminals of said second coincidence network to said third input circuit, and limiting means limiting the time interval that said third control signal is effective to actuate the said second input terminal to which one of said connecting means is operatively connected.

4. The device of claim 3 in which said limiting means limits the time interval that said third control signal is effective to actuate both of said second input terminals.

5. The device of claim 1 in which control means is provided to cause said transmitter to transmit said first control signal for a predetermined desired interval.

6. The device of claim 5 in which said control means is operatively connected to said receiver for actuation by said third control signal.

7. In combination, a local and a remote operating network, said local network having a local transmitter and a local receiver, said remote network having a remote transmitter and a remote receiver, a communicating channel interconnecting said networks, for the transmission of a first signal from said local transmitter to said remote receiver and a second signal from said remote transmitter to said local receiver, said local and remote networks having local and remote control apparatus respectively, said local control apparatus including local initiating means to actuate said local transmitter independently of said local receiver to cause the transmission of said first signal to said remote receiver, said local apparatus including first and second timing devices for timing out first and second time intervals respectively and including circuit means activated by said local initiation means to start the timing out of their said time intervals, said remote control apparatus including remote initiating means to actuate said remote transmitter to cause the transmission of said second signal to said local receiver, said remote initiating means being operatively connected to said remote receiver and actuatable thereby to actuate said remote transmitter when said remote receiver is initially actuated by said first signal, said local control apparatus including a local comparing means having first and second and third input circuit means and an output circuit means, said first input means being operatively connected to said first timing device and effective during at least a final portion of said first interval to provide a first logical signal to said first input means, said second input means being operatively connected to said second timing device and effective solely subsequent to the timing out of said second interval to provide a second logical signal to said second input means, said third input means being operatively connected to said local receiver and effectively solely subsequent to the reception by said local receiver of said second signal to provide a third logical signal to said third input means, said comparing means being effective to supply a fourth logical signal solely when said first and said third logical signals are concurrently supplied and when said second and said third logical signals are concurrently supplied.

8. The combination of claim 7, in which one of said operating networks includes limiting means to determine the time duration that said third logical signal may be provided to said third input means.

9. The combination of claim 8 in which said limiting means limits the time duration that said remote transmitter is effective to supply said second signal.

10. The combination of claim 8 in which said limiting means limits the time duration that said local transmitter is effective to supply said first signal.

11. The combination of claim 10 in which said limiting means is a timing network operatively interconnecting said local initiating means and said local transmitter and which times the period that said local transmitter is effective to transmit said first signal.

12. The combination of claim 11 in which said timing network also operatively interconnects said local initiating means and said first input connection of said comparing means to prevent the establishing of said fourth logic signal in the event of the concurrent supplying of said first and said third logic signals prior to the timing out of said timing network.

13. The combination of claim 9 in which said first and second signals are pulsating signals operating at first and second frequencies respectively, said local receiver is not actuable when energized by a signal at said first frequency.

14. The combination of claim 7 in which said local operating network includes transmitter energizing means interconnecting said local receiver and said local transmitter, said transmitter energizing means being effective to energize said local transmitter to provide said first signal when said local receiver receives said second signal, and means interconnecting said local initiating means and said transmitter energizing means and effective to render said transmitter energizing means ineffective to actuate said local transmitter when said local initiating means actuates said local transmitter.

15. The combination of claim 7 in which said local and said remote operating networks respectively include a local and a remote fault detector, said local operating network including local blocking circuit means connecting said local fault detector to said local initiating means, said local blocking means being effective to prevent actuation of said local transmitter by said local initiating means, said remote operating network including remote blocking circuit means connecting said remote fault detector to said remote initiating means, said remote blocking means being effective to prevent actuation of said remote transmitter by said remote initiating means.

16. The combination of claim 7 in which said first interval is of lesser magnitude than the magnitude of said second interval.

17. The combination of claim 15 in which said first interval is of lesser magnitude than the magnitude of said second interval, said local operating network including an unsatisfactory device for indicating an unsatisfactory operation of said communicating channel and including an unsatisfactory device timer, said unsatisfactory device being couple to said output circuit means of said local comparing means and actuatable by said fourth signal, said unsatisfactory device timer being effective to maintain said unsatisfactory device actuated in its indicating condition for a desired time interval subsequent to the actuation thereof by said fourth signal.

18. The combination of claim 17 in which said local operating network includes a satisfactory device for indicating a satisfactory operation of said communicating channel, and including a satisfactory device timer, said satisfactory device being coupled to said output circuit means of said local comparing means and actuatable in the absence of said fourth signal, said satisfactory device timer being effective to maintain said satisfactory device in its indicating condition for s desired time interval subsequent to the actuation thereof by the absence of said fourth signal.

19. The combination of claim 7 in which said local initiating means is also operatively connected to said local receiver and actuatable thereby to actuate said local transmitter when said local receiver is initially actuated by said second signal, said remote initiating means also being effective to actuate said remote transmitter independently of said remote receiver to cause the transmission of said second signal to said local receiver, said remote apparatus also including first remote and second remote timing devices for timing out first remote and second remote time intervals respectively and also including remote circuit means actuated by said remote initiating means to start the timing out of their said time intervals, said remote control apparatus including a remote comparing means having first remote and second remote and third remote input circuit means and a remote output circuit means, said first remote input means being operatively connected to said first remote timing device during at least a final portion of said first remote interval to provide a first remote logical signal to said first remote input means, said second remote input means being operatively connected to said second remote timing device and effective solely subsequent to the timing of said second remote interval to provide a second remote logical signal to said second remote input means, said third remote input means being operatively connected to said remote receiver and effective solely subsequent to the reception by said remote receiver of said first signal to provide a third remote logical signal to said third remote input means, said remote comparing means being effective to supply a fourth remote logical signal solely when said first remote and said third remote logical signals are concurrently supplied and when said second remote and said third remote logical signals are concurrently supplied.

20. The combination of claim 19 in which said first time interval of said local apparatus is equal to the designed time interval for said first signal to be transmitted from said local transmitter to said remote operating network plus the designed time interval for said second signal to be transmitted by said remote operating network to said local operating network and appear therein as its said third logical signal minus an interval equal to the desired design tolerance limit, said second time interval of said local apparatus being equal to said first time interval of said local apparatus plus twice the magnitude of said desired design tolerance.

21. The combination of claim 20 in which both of said first time intervals are equal to each other and both of said second time intervals are equal to each other.

* * * * *